United States Patent Office
3,832,318
Patented Aug. 27, 1974

3,832,318
SUSPENSION EMULSION INTERPOLYMERS
Ruth E. Gallagher, Dobbs Ferry, N.Y., Charles L. Harrington, Newark, Del., and Melvin Wachtel, North Massapequa, N.Y., assignors to Stauffer Chemical Company, Westport, Conn.
No Drawing. Continuation of appplication Ser. No. 182,160, Sept. 20, 1971, which is a continuation-in-part of application Ser. No. 101,159, Dec. 23, 1970, both now abandoned. This application Mar. 22, 1973, Ser. No. 343,993
Int. Cl. C08d 9/10; C08f 37/18, 29/24
U.S. Cl. 260—29.7 UP                                      14 Claims

ABSTRACT OF THE DISCLOSURE

Rubber-containing interpolymers are prepared by the suspension polymerization of vinyl chloride in the presence of an aqueous emulsion of particles comprising a crosslinked acrylic rubber having a Tg of less than about 25° C. The resulting interpolymer particles are particularly useful as high impact plastics and as modifiers for the reinforcement of relatively rigid types of plastics.

RELATED APLICATION

This is a continuation of application Ser. No. 182,160 filed Sept. 20, 1971, which is a continuation-in-part of application Ser. No. 101,159, filed Dec. 23, 1970, both now abandoned.

BACKGROUND OF THE INVENTION

It is a common practice to reinforce such rigid plastics as polyvinyl chloride, polymethyl methacrylate, polystyrene, styrene-acrylonitrile copolymers and the like with particles of rubber polymers such as polybutadiene and the polyacrylates. The addition of rubber to these common plastics improves their impact strength, that is their ability to withstand a rapidly applied shock. While the addition of rubber improves the impact strength of these plastics, their other physical properties such as tensile strength, clarity, heat distortion temperature, hardness and aging stability are, however, adversely affected by the rubber.

A procedure which is often used to reinforce such hard, brittle polymers involves their preparation in the presence of rubbers. The products resulting from such polymerization procedure which are referred to as interpolymers or graft copolymers, normally have rubber contents of about 20–60%. These high rubber content materials are employed as so-called "impact modifiers" by being blended with brittle plastics in order to enhance their impact strength. The rubber content of these blends is generally about 5–25%. For example, styrene-acrylonitrile, i.e. "SAN," monomers are commonly polymerized in the presence of polybutadiene rubbers at about a 50/50 SAN to rubber ratio. The resulting graft copolymer is then blended with a conventional styrene-acrylonitrile copolymer to a rubber content of about 10–20% so as to produce ABS type plastics.

TECHNICAL DISCLOSURE OF THE INVENTION

In brief, the novel process of this invention comprises the suspension polymerization of vinyl chloride, or a mixture of vinyl chloride with a minor proportion of one or more comonomers, in the presence of an aqueous emulsion of crosslinked, acrylic rubber particles. The latter process yields particles of what may be termed as "suspension-emulsion interpolymer" (SEI) particles in which microscopic examination reveals that the polymer of the suspension polymerized vinyl monomer, i.e. the polyvinyl chloride, surrounds and/or is intimately dispersed throughout the mass of the rubber particles. This phenomenon apparently results from the fact that the vinyl chloride monomer which is used for the final suspension polymerization step, has partially swollen the rubber particles prior to polymerizing. The resulting particles, having been prepared by means of a suspension process, are in the form of agglomerates which have a particle size that is substantially greater than that of the original rubber emulsion particles utilized in their preparation. As a result, these SEI particles are far easier to dry and to handle than are these rubber emulsion polymer particles. Moreover, they provide superior results as high impact plastics and as modifiers for the reinforcement of a large variety of rigid plastics wherein they impart excellent impact strength without substantially detracting from any other physical properties. Thus, as used in this disclosure, the term "interpolymer" denotes a product resulting from the polymerization of one or more monomers in the presence of a previously prepared homo- or copolymer. Moreover, the term "rigid polymer" or "rigid plastic," as defined by ASTM D–883, denotes a polymer or plastic that has a modulus of elasticity, either in flexure or in tension, greater than 7,000 kg./cm.$^2$. (100,000 p.s.i.) at 23° C. and 50% relative humidity when tested in accordance with ASTM D–747, D–790, D–639 or D–882.

Because of the high rubber content in the novel modifiers of this invention which is in the range of from about 2–50%, by weight, only small quantities of these impact modifiers are required in order to improve the impact strength of a brittle plastic. For example, when being blended with polyvinyl chloride, their use in a concentration as low as about 5 phr. can be effective. Thus, the prior art, as exemplified by German Patent No. 1,090,857 and U.S. Pat. No. 3,488,406, teaches the preparation of an impact modified polyvinyl chloride containing about 2–20%, by weight, of acrylic rubber which is prepared by means of a similar interpolymerization type process. However, unless such special techniques as are set forth in this disclosure are employed, the high rubber concentrations necessary to yield efficient impact modifiers cannot be attained under practical conditions by the use of the prior art techniques.

The interpolymer product of this invention exhibits improved heat stability, weatherability, and oxidative stability over impact modifiers which are based on polybutadiene type rubbers, e.g. ABS and MBS type additives. This improvement results from the fact that the polybutadiene rubbers contain residual unsaturation which is susceptible to oxidation so that the impact modifiers based upon such rubbers must almost always be stabilized with from about 0.2–3% of an expensive antioxidant. By contrast, the modifiers of this invention contain an acrylic type rubber which resists oxidative degradation and therefore requires the addition of little, if any, additional antioxidants. Thus, the SEI product of this invention is particularly suitable for outdoor uses since it undergoes little, if any, discoloration during either processing or aging whereas many ABS and MBS type products lose their effectiveness on aging.

The novel interpolymer product of this invention can also impart flame retardance as well as impart strength when used as a modifier for such flammable thermoplastics as polystyrene, polymethyl methacrylate, styrene-acrylonitrite copolymers and polycarbonates, etc. This is a particularly advantageous property if the resulting polymer blends are to be used in the building construction, automotive, home furnishing or aerospace industries. The flame retardancy imparted by these novel impact modifiers is thought to result from their high chlorine content, which is in the range of from about 25–45%, by weight.

It should also be noted that the suspension-emulsion interpolymerization process which is used to prepare the impact modifiers of this invention has distinct advantages over the methods heretofore used to prepare other impact modifiers. Thus, most impact modifiers are prepared by means of graft emulsion polymerization procedures in which the resulting graft copolymer emulsions must then be coagulated with brine or spray dried. On the other hand, in the process of this invention, the vinyl chloride is suspension polymerized yielding a granular product which is readily filtered free of water and then air dried. The need for a separate isolation step for the polymer is thereby eliminated. In addition, the product is substantially free of ionic impurities and emulsifiers which tend to impair its heat stability.

In a preferred embodiment of this invention, the SEI particles can be blended or diluted with a homo- or copolymer of vinyl chloride which has been prepared by means of a conventional aqueous suspension polymerization process. Applicable vinyl chloride copolymers include copolymers of vinyl chloride together with a minor proportion of one or more of such vinyl monomers as the alpha-olefins such as ethylene, propylene and butylene; vinyl esters of carboxylic acids such as vinyl acetate, vinyl benzoate, vinyl butyrate, and vinyl stearate; vinylidene halides such as vinylidene chloride; the $C_1$–$C_{20}$ alkyl esters of acrylic and methacrylic acid such as methyl methacrylate, methyl acrylate, ethyl acrylate, butyl acrylate, 2-ethylhexyl acrylate and lauryl acrylate; aryl, halo- and nitro-substituted benzyl esters of acrylic and methacrylic acid such as benzyl acrylate and 2-chlorobenzyl acrylate; ethylenically unsaturated monocarboxylic acids such as acrylic and methacrylic acids; ethylenically unsaturated dicarboxylic acids, their anhydrides and their $C_1$–$C_{20}$ mono- and dialkyl esters such as aconitic acid, fumaric acid, maleic acid, itaconic acid, citraconic acid, maleic anhydride, dibutyl fumarate and monoethyl maleate; amides of ethylenically unsaturated carboxylic acids such as acrylamide and methacrylamide; vinyl aryl compounds such as styrene and alphamethyl styrene; nitriles of ethylenically unsaturated carboxylic acids such as acrylonitrile and methacrylonitrile; vinyl pyrrolidones such as N-vinyl-2-pyrrolidone; $C_1$–$C_{20}$ alkyl vinyl ethers such as methyl vinyl ether, ethyl vinyl ether and stearyl vinyl ether; dienes such as isoprene and butadiene; and, any other vinyl monomers copolymerizable with vinyl chloride. From this group, the use of vinyl esters such as vinyl acetate is preferred. The resulting products are found to have improved physical properties as evidenced by their superior impact strength which is achieved without any substantial reduction in their tensile strength.

In greater detail, now, the rubber particles which are utilized in preparing the novel SEI particles of this invention are made by means of conventional aqueous emulsion procedures well known to those skilled in the art using emulsifiers and water soluble catalysts.

Thus, in conducting the aqueous emulsion polymerization step leading to the preparation of these rubber particles, there is first prepared a monomer charge comprising an aqueous emulsion containing about 10 to 50%, by weight, of one or more monomers the identity of which will be described in detail hereinbelow. From about 0.05 to 2.0%, by weight of the monomer mixture, of a water soluble catalyst such, for example, as ammonium, sodium or potassium persulfate, hydrogen peroxide or a redox system such as a mixture of a persulfate with an alkali metal bisulfite, thiosulfate or hydrosulfite is introduced and the mixture is then heated at a temperature of from about 40 to 95° C. for a period of about 0.5 to 8 hours. The emulsion should also contain from about 0.2 to 2.0%, by weight of the total monomer charge, of one or more suitable emulsifiers as described hereinbelow.

Thus, it has been found that optimum results are obtained by the use of emulsifiers which are at the extreme ends of the "HLB" Classification scale as described, for example, in the article entitled "EMULSIONS" by W. C. Griffin which appears in the Encyclopedia of Chemical Technology, Vol. 8, Second Edition, Pages 117–134, 1963. Thus, the "HLB" scale, of from 0 to 50, can be defined as an expression of the relative simultaneous attraction of an emulsifier for water and for oil. It would appear to be determined by the chemical composition and the extent of ionization of a given emulsifier. For example, a propylene glycol monostearate has a low HLB value, i.e. it is strongly lipophilic, while a polyoxyethylene monostearate having a long polyoxyethylene chain has a medium HLB value, i.e. it is moderately hydrophilic. And, at the other end of the "HLB" scale, for example, is sodium stearate which has a very high HLB value, i.e. it is hydrophilic, since it ionizes and thus provides an even stronger hydrophilic group.

It has been found that the use of those surfactants which are at the extreme ends of the HLB scale results in the formation of large latex particles in the range of from about 0.1 to 0.8 microns which are highly desirable for use in carrying out the process of this invention. Typical of this group of surfactants are the sulfosuccinates, specifically the $C_{13}$ bis(tridecyl) ester of sodium sulfosuccinic acid which exhibits an HLB value of about 4–7. This surfactant yields the desired large particle size latices in a "one shot" polymerization process, i.e. a process which does not require incremental addition of the surfactant charge. However, as the chain length of the alkyl ester groups in a sulfosuccinate surfactant is reduced to a length of about 6–8 carbon atoms, the HLB value increases to a range of from about 20–40 and the latex particle which are produced will be undesirably small, i.e. in the range of from about 0.06–0.1 microns. Similarly, with respect to the alkyl sulfate surfactants, the $C_{16}$ sodium cetyl sulfate will, for example, yield an undesirable small particle size of from about 0.06–0.1 microns while an alkyl sulfate salt with a short C–8 alkyl group, particularly sodium 2-ethylhexyl sulfate, has a higher HLB value of about 50 and yields a latex having the desired large particle size of from about 0.1 to 0.8 microns. Thus, it may be concluded that the applicable surfactants for use in the emulsion polymerization step of the process of this invention should have an HLB value of either about 2 to 12 or greater than about 40. Moreover, the use of surfactants with HLB values which are not at the extreme ends of the scale also tends to cause plate out during the subsequent suspension polymerization step. This undesirable phenomenon will be discussed in greater detail hereinbelow.

Accordingly, the use of emulsifiers within the above range of HLB values has been found to lead to the preparation of the SEI rubber polymer particles of this invention in a desirably large particle size of from about 0.1–0.8 microns by means of a highly convenient procedure as opposed to the involved techniques described in the prior art for the preparation of products of this type. Thus, for example, in U.S. Pat. No. 3,488,406, it is seen that the polymerization of rubber polymer particles using an emulsifier which is only moderately hydrophobic requires the separate, incremental addition to the system of the monomers and of the catalyst over the rather extended period of ten hours. By contrast, the use of emulsifiers having the above specified HLB values in the process of this invention permits the convenient preparation of the large particle size rubber polymers by means of a procedure in which, in contrast to the teachings of the prior art, all of the surfactant can be added to the system at one time and in which the entire process is completed in from about one to three hours.

Moreover, in a preferred embodiment of the process of this invention, it has been found that regardless of the particular emulsifier being utilized in preparing the rubber polymer latex, its polymerization in large scale commercial equipment is greatly facilitated by introducing the monomer charge to the system in about three equal portions over a period of from about 1 to 3 hours. Thus, where this is not done and the total monomer charge is introduced in one portion, the resulting exothermic polymerization reaction often becomes virtually uncontrollable leading to overheating which, in turn, may set up, i.e. coagulate, the resulting polymer latex. However, by dividing the monomer charge and introducing it in about three equal portions, the resulting polymerization reaction remains controllable and overheating and coagulation can be prevented.

The acrylic rubber particles used in preparing the SEI particles of this invention can comprise any crosslinked acrylic polymer or copolymer having a Tg, i.e. a glass transition temperature of less than about 25° C. and which can be polymerized by means of free radical initiated emulsion techniques. These acrylic rubber particles should be crosslinked so that they can retain their size and shape during subsequent polymer processing steps. This crosslinking can be achieved during the polymerization of the acrylic rubber if a polyfunctional ethylenically unsaturated monomer is included in the polymerization recipe. As used in this disclosure, the term "crosslinked" denotes a polymer which at ambient temperatures is substantially insoluble in such organic solvents as tetrahydrofuran or cyclohexanone.

Examples of acrylic rubbers that can be used include the polymers of the aromatic and the $C_2$–$C_8$ alkyl acrylates such as poly(benzyl acrylate) and poly(n-butyl acrylate), poly(ethyl acrylate) and poly(2 - ethylhexyl acrylate), which are crosslinked with small quantities of a polyfunctional ethylenically unsaturated monomer, i.e. a monomer containing at least two ethylenically unsaturated groups such, for example as allyl methacrylate, divinyl benzene, diethylene glycol dimethacrylate, ethylene glycol dimethacrylate, trimethylolpropane trimethacrylate, methylene-bis-acrylamide, diethylene glycol diacrylate, ethylene glycol diacrylate, divinyl ether, diallyl fumarate, diallyl phthalate, divinyl sulfone, divinyl carbitol, triethylene glycol dimethacrylate, trimethylene glycol diacrylate, butylene glycol diacrylate, pentamethylene glycol diacrylate, glyceryl triacrylate, octylene glycol diacrylate, trimethylene propane triacrylate, the tetraacrylate ester of pentaerythritol and various diallyl phosphonates. Preferred for this purpose, however, is 1,3-butylene dimethacrylate.

Also useful are copolymers of the aromatic and $C_2$–$C_8$ alkyl acrylates with minor proportions of one or more of such vinyl monomers as styrene; acrylonitrile, vinyl acetate, methyl methacrylate; ethylenically unsaturated carboxylic acids such, for example, as acrylic, methacrylic, itaconic and maleic acids; isoprene; chloroprene; 1,3-butadiene; vinylidene chloride; propylene; ethylene; and, other common vinyl monomers. Optimum results are, however, obtained by the use of the crosslinked copolymer containing from about 90 to 99.8%, by weight, of n-butyl acrylate and from about 0.2 to 10%, by weight, of 1,3-butylene dimethacrylate.

The next step in the process of preparing these SEI particles involves the suspension polymerization of a monomer charge comprising vinyl chloride in the presence of the aqueous emulsion of rubber particles whose preparation has been described hereinabove. In addition to vinyl chloride, one may also use a monomer charge comprising a mixture of vinyl chloride with a minor proportion of one or more additional vinyl monomers other than vinyl chloride including the vinyl esters such as vinyl acetate, vinyl phosphonates such as bis(beta-chloroethyl) vinylphosphonate, vinylidene halides, olefins, alkyl vinyl ethers and the ethylenically unsaturated dicarboxylic acids, their anhydrides and their $C_1$–$C_8$ mono- and dialkyl esters. A more complete listing of these vinyl monomers is included in the preceding description of the preferred embodiment of this invention involving the blending of the SEI particles with polyvinyl chloride. It is, however, preferred to employ vinyl chloride as the sole monomer during this suspension polymerization step.

In conducting the suspension polymerization, the vinyl chloride or the mixture of vinyl chloride with one or more comonomers is added to the previously prepared aqueous emulsion of the rubber polymer particles in a concentration of about 40 to 90%, by weight, of the latter rubber particles. Also required to be admixed with the aqueous emulsion of the rubber polymer particles is a concentration of from about 0.05 to 1.0%, as based on the total weight of the vinyl chloride monomer or monomer mixture which has been added to the aqueous emulsion of the rubber polymer particles, of a suspending agent such, for example, as methyl cellulose, hydroxyethyl cellulose, hydroxypropyl cellulose, carboxymethyl cellulose, talc, clay, polyvinyl alcohol, gelatine and the like. Preferred for this purpose is hydroxypropyl methyl cellulose which should, preferably, have a viscosity of at least about 3,000 and, preferably, about 15,000 cps. as determined, at 20° C., with a 2%, by weight, aqueous solution of the polymer in a Ubbelohde viscometer according to ASTM Procedures D–1347–64 and D–2363–65T. This same procedure is used in determining the viscosity of the various grades of this suspending agent whose use is subsequently described in this disclosure.

Thus, the use of the latter suspending agent has been found to provide for an extremely clean reaction system. More particularly, the use, as a suspending agent, of hydroxypropyl methyl cellulose having the above specified molecular weight requirements is found to virtually eliminate the phenomenon of plate out in the suspension polymerization step of the process of this invention whereas the use of other suspending agents often leads to a significant degree of plate out. Thus, as is known to those skilled in the art "plate out" refers to the undesirable formation of a skin or film of polymer on the reactor wall. Needless to say, this skin presents a serious problem since it must be removed prior to any subsequent usage of the reactor inasmuch as it interferes with proper heat transfer during polymerization. Therefore, the discovery that the use of a certain molecular weight grade of hydroxypropyl methyl cellulose represents a substantial improvement over the prior art process for preparing SEI particles such, for example, as described in German Patent 1,090,857, since the need for having to clean the reactor between runs, particularly in large commercial reactors, is an expensive and time consuming procedure.

In addition, the use of the above described grade of hydroxypropyl methyl cellulose results in the attainment of a satisfactory bulk density and particle size distribution on the part of the resulting SEI particles. As will be explained in greater detail hereinbelow, the attainment of each of the latter two characteristics, i.e. satisfactory bulk density and particle size distribution, is a factor of vital significance in the process of the subject invention.

In addition, a monomer soluble catalyst or initiator such, for example, as azobisisobutyronitrile, lauroyl peroxide, benzoyl peroxide or isopropylperoxy dicarbonate should be present in a concentration of from about 0.02 to 1.0%, by weight, of the vinyl chloride monomer or monomer mixture that has been added to the rubber polymer emulsion. It has also been found that adjusting the pH of the rubber latex to a level within the range of from about 3–9 has the effect of improving its mechanical stability and also serves to produce a clean reaction during the subsequent suspension polymerization step. This pH adjustment may be readily accomplished by the addition, to the emulsion, of the requisite quantity of a basic solution such, for example, as an aqueous solution of sodium carbonate or bicarbonate or of sodium hydroxide.

Polymerization may then be initiated by heating the above described recipe at a temperature in the range of from about 45 to 75° C. and for a period of from about 2 to 12 hours with agitation being applied throughout the course of the reaction. The resulting product is an aqueous suspension of SEI particles wherein the supernatant fluid is completely devoid of any of the original rubber polymer emulsion. The total SEI particle solids content of these suspensions will be in the range of from about 20 to 50%, by weight. Each of these SEI particles comprise, in effect, a particle of rubber polymer prepared by means of an emulsion polymerization procedure having a vinyl chloride suspension polymer which has been polymerized on to the rubber polymer particle by means of a suspension polymerization step so that it surrounds and/or is homogeneously dispersed throughout the mass of the crosslinked acrylic rubber emulsion polymer particle. The extent to which this vinyl chloride suspension polymer will surround and/or be dispersed within the mass of the crosslinked acrylic rubber emulsion polymer particle will, of course, be determined by the particular monomers which are utilized in the suspension polymerization step as well as by the particular polymer which comprises the crosslinked acrylic rubber polymer fraction.

Thus, in these SEI particles, the crosslinked acrylic rubber emulsion polymer may be present in a concentration of from 2.0 to 50%, by weight; said rubber particles having the suspension polymer surrounding and/or homogeneously dispersed therein; the latter proportions being based on the total weight of the SEI interpolymer particles. Preferred products should contain from about 30–50%, by weight, of the crosslinked acrylic rubber emulsion polymer and about 50–70%, by weight, of the vinyl chloride suspension polymer surrounding and/or homogeneously dispersed throughout the mass of said rubber emulsion polymer.

It is important, with respect to this disclosure, to distinguish between the processes of suspension and emulsion polymerization.

Thus, suspension polymerization refers to a method of polymerization whereby one or more monomers is dispersed in a suspension medium which is a non-solvent for both the monomer and the resulting polymer. Generally water is utilized for this purpose and a monomer soluble, i.e. an oil soluble, polymerization initiator is thereupon introduced. Polymerization takes place within the monomer phase containing the polymerization initiator. The use of the suspending medium assists in the dissipation of the heat of reaction and the polymerization reaction and consequently the molecular weight of the resulting polymer is therefore easier to control. Suspension polymerization is generally accomplished by dispersing the monomer in the suspending medium either by constant agitation or by the use of a suspending agent or both. Various suspending agents are known in the art such, for example, as gelatine, hydroxymethyl cellulose, hydroxyethyl cellulose, methyl cellulose, carboxymethyl cellulose, talc, clay, polyvinyl alcohol and the like.

By contrast, emulsion polymerization involves a process whereby one or more monomers are emulsified in the form of droplets within a continuous phase which should be inert with respect to both the emulsified monomers and the resulting polymer. Water is generally selected as the continuous phase. Emulsification of the monomers is facilitated by the use of one or more emulsification agents which tend to reduce the interfactial tension between the dispersed and continuous phases. Typical emulsifiers include common soaps, salts of long-chain carboxylic and sulfonic acids, alkylated aromatic sulfonic acids and salts of long-chain amines.

A water soluble initiator is employed and it is believed that the polymer chains originate in the continuous, aqueous phase and then continue their growth in the dispersed monomer-polymer phase yielding the polymer product in a finely divided state which remains emulsified within the continuous, aqueous medium. Thus, an important distinction between emulsion and suspension polymerization is that in the former, the monomer is either dispersed into droplets which are stabilized by an adsorbed layer of soap molecules or is solubilized in the soap micelle which is present in aqueous soap solutions. As a result, stable polymer emulsions are readily obtained whereas, in a suspension polymerization, the resulting polymer particles are of a relatively larger mass which tend to more readily separate out from the suspension.

A preferred procedure for carrying out the process of this invention involves the preparation of the crosslinked acrylic rubber latex in the same reactor in which the vinyl chloride polymer will subsequently be polymerized. This avoids the need for subsequently removing the rubber latex from the reactor in which it was originally prepared and then introducing it into a different reaction vessel.

The SEI particles resulting from the process of this invention should desirably have a particle size in the range of from about 10 to 200 microns and can, therefore, be readily recovered, as by filtration on a Buchner funnel or similar apparatus, and thereupon simply air dried. There is no need for the use of a costly and time-consuming spray drying or coagulation procedure as is usually required for the isolation, on a large scale commercial basis, of the rubber polymer particles from which these SEI particles are themselves prepared. These SEI particles should also have a bulk density of at least about 0.2 and preferably about 0.3–0.4 gm./cm.$^3$ as determined, for example, by ASTM D–1895. The possession, by the SEI particles, of the above stated particle size and bulk density characteristics is highly advantageous with respect to their subsequent admixture with ordinary polyvinyl chloride; the preparation of such blends, as has been noted hereinabove, being one of the preferred embodiments of this invention.

Rigid plastics that can be reinforced by the introduction of the SEI particles of this invention include:

(1) Polymers of vinyl chloride including polyvinyl chloride and the random copolymers, graft copolymers and interpolymers of vinyl chloride with a minor proportion of one or more of the previously noted group of vinyl comonomers. As used in this disclosure, the term "graft copolymer" denotes a polymer molecule in which the main backbone chain has attached to it, at various points, side chains containing atoms or groups different from those in the main chain.

(2) Polymers of nitriles of ethylenically unsaturated acids including polymethacrylonitrile, polyacrylonitrile and the copolymers of methacrylontrile, or acrylonitrile, and a minor proportion of one or more vinyl monomers such as the lower alkyl acrylates and methacrylates, styrene and alpha-methyl styrene.

(3) Polymers of methyl methacrylate including polymethyl methacrylate and the copolymers of methyl methacrylate with minor proportions of one or more alpha, beta-ethylenically unsaturated monomers which are polymerizable therewith including the $C_1$–$C_8$ alkyl, cycloalkyl and bicycloalkyl esters of acrylic acid and the $C_2$–$C_8$ alkyl, cycloalkyl and bicycloalkyl esters of methacrylic acid such, for example, as ethyl acrylate and methacrylate, butyl methacrylate, 2-ethylhexyl methacrylate, norbornyl acrylate, and cyclohexyl acrylate; vinyl aryl compounds such, for example, as alpha-methyl styrene and stryene; and, nitriles of alpha, beta-ethylenically unsaturated carboxylic acids such, for example, as acrylonitrile and methacrylonitrile. From the above given group, the use of the $C_1$–$C_8$ alkyl esters of acrylic acid, particularly ethyl acrylate, and of the $C_2$–$C_8$ alkyl esters of methacrylic acid is preferred.

(4) Acrylonitrile-butadiene-styrene resins, commonly referred to as "ABS" resins, which generally comprise either a mixture of a 60 to 80:40 to 20 styrene:acrylonitrile copolymer with from about 10 to 40%, by weight, of a 5 to 40:95 to 60 acrylonitrile-butadiene copolymer or a mixture of a 60 to 80:40 to 20 styrene:acrylonitrile copolymer with from about 10 to 40%, by weight, of a graft of the latter copolymer onto polybutadiene.

(5) Poly(alpha-olefins) such as polypropylene and polyethylene and copolymers of one or more alpha-olefins, such as ethylene or propylene, with a minor proportion of one or more ethylenically unsaturated monomers including 4-methyl pentene-1, butene-1, norbornene and its derivatives; cyclopentadiene; cyclopentene; cyclobutene; vinyl acetate; the $C_1$–$C_{12}$ alkyl acrylate and methacrylate esters; as well as blends of the homo- and copolymers of alpha-olefins with other types of thermoplastic polymers.

(6) Polymers of styrene including polystyrene, poly (alphamethyl styrene) and poly(tertiary butyl styrene) and copolymers of styrene, alpha methyl styrene or tertiary butyl styrene with a minor proportion of one or more ethylenically unsautrated comonomers such, for example, as nitriles of ethylenically unsaturated carboxylic acids including acrylonitrile and methacrylonitrile; $C_1$–$C_{12}$ alkyl esters of acrylic and methacrylic acids such, for example, as methyl methacrylate and 2-ethylhexyl acrylate; and, graft copolymers of styrene, tertiary butyl styrene or alpha-methyl styrene with polybutadiene and other hydrocarbon elastomers.

(7) Cellulosic resins including cellulose esters and mixed esters such, for example, as cellulose nitrate, cellulose acetate, cellulose butyrate, cellulose propionate, cellulose acetate-butyrate, cellulose acetate-propionate and cellulose ethers such, for example, as ethyl cellulose.

(8) Polyamide resins, i.e. the resins made by the condensation of di- or polyamines with di- or polybasic acids or by polymerization of lactams or amino acids. Typical polyamides include nylon 4 which is made from pyrrolidone; nylon 6 obtained by polycondensation of caprolactam; nylon 66 obtained by the condensation of hexamethylene diamine with adipic acid; nylon 610 obtained by the condensation of hexamethylenediamine with sebacic acid; nylon 7 which is a polymer of ethyl aminoheptanoate; nylon 9 made from 9-aminononanoic acid; and, nylon 11 made from 11-amino undecanoic acid;

(9) Polyester resins; i.e. the resins produced by the condensation of saturated or unsaturated dibasic acids, such as terephthalic, maleic, fumaric, isophthalic, adipic and azelaic acids with dihydric alcohols such as ethylene glycol, propylene glycol, diethylene glycol and dipropylene glycol. Where the resin is made with an unsaturated acid, a polymerizable monomer such, for example, as styrene, vinyl toluene, diallyl phthalate, methyl methacrylate; chlorostyrene, alpha-methyl styrene, divinyl benzene or triallyl cyanurate is often included in the composition:

(10) Polyurethane resins, i.e. the resins formed by the reaction between a bi- or polyfunctional hydroxyl containing compound, such as a polyether or polyester, and a di- or polyisocyanate such as toluene diisocyanate or diphenylmethane-4, 4'-diisocyanate;

(11) Polycarbonate resins, i.e. the resins derived from the reaction between a difunctional alcohol or phenol, such as bisphenol A, and phosgene or an alkyl or aryl carbonate;

(12) Polyacetal resins, i.e. the resins derived from the anionic polymerization of formaldehdye to obtain a linear molecule of the type —O—$CH_2$—O—$CH_2$—O—$CH_2$—;

(13) Polyphenylene oxide resins made by the oxidative polymerization of 2,6-dimethylphenol in the presence of a copper-amine-complex catalyst;

(14) Polysulfone resins, i.e. the resins containing an $SO_2$ linkage as derived from the reaction of sulfur dioxide with olefins such as 1-butene or, more preferably, by reaction of bis-phenol A with 4,4'-dichlorodiphenyl sulfone.

(15) The acrylate:styrene:acrylonitrile resins, commonly referred to as "ASA" resins, which comprise copolymers containing a major proportion of a $C_2$–$C_8$ alkyl acrylate or methacrylate elastomer upon which is grafted about 65–95%, by weight of the latter copolymer, of a 70–80:30–20 styrene:acrylonitrile copolymer.

(16) The methacrylate:butadiene:styrene resins, commonly referred to as the "MBS" resins, which comprise a minor proportion of a methyl methacrylate:styrene:acrylonitrile terpolymer grafted and/or blended with either polybutadiene or a copolymer of butadiene and minor proportions of such comonomers as, for example, styrene and acrylonitrile.

In effect, one may utilize any rigid, thermoplastic polymer, i.e. any polymer that may be softened by heat and then regain its original properties on cooling, in preparing polyblends with the novel SEI particles of this invention.

The SEI particles may be dispersed in the rigid plastics by means of any convenient procedure which will result in an intimate admixture of the SEI particles within the mass of the substrate polymer. This may be accomplished by mill blending, coextruding or by blending the SEI particles with the substrate while both are in the form of solid powders, aqueous dispersions or slurries. With respect to proportions, the resulting blends should contain a sufficient concentration of the SEI particles so that from about 0.5 to 30%, by weight, of rubbery polymer derived from the SEI particles is present therein.

The SEI particles of this invention are specially useful as impact additives and may also be used as processing aids for various polymers, notably polyvinyl chloride. For instance, when added to polyvinyl chloride at a 2 to 20% by weight level, as based on the total weight of rubber derived from the SEI particles which are present in the resulting mixture, an increase in the impact strength of the polyvinyl chloride is obtained along with improved processability.

As noted earlier, a preferred embodiment of the process of this invention relates to the dilution of the SEI particles with polyvinyl chloride or a vinyl chloride copolymer. This may be accomplished by diluting or blending the original aqueous suspension in which the SEI particles were polymerized with a homo- or copolymer of vinyl chloride which may be in bulk, solution, suspension or emulsion form; or, it may involve the addition of the dried, isolated SEI particles to a dried suspension of the polymeric diluent. For example, a polyvinyl chloride-SEI blend containing 30% rubber derived from the SEI particles can be mixed in the proportions from about 1:1 to 1:60 with regular, unmodified polyvinyl chloride to yield a product containing 0.5 to 17%, by weight, of rubber derived from the SEI particles. For optimum results, these blends should contain from about 3 to 90%, by weight, of the SEI particles. Products prepared from the latter blends are found to have improved physical properties, particularly with respect to their impact strength, without any substantial loss in their tensile strength.

Thus, by diluting the SEI polymer particles in this manner, it has been found that it is possible to start with SEI particles having a given concentration of rubber which, subsequent to dilution with a polymer such as PVC, will generally yield a product whose impact strength is comparable to the original SEI material despite its reduced, overall rubber content while its tensile strength is also ordinarily improved.

The following examples will further illustrate the embodiment of this invention. In these examples, all parts given are by weight unless otherwise noted. In addition, it is to be pointed out that the glass transition temperature of all of the rubber polymers described in these examples is less than 25° C.

EXAMPLE I

This example illustrates the preparation of SEI particles by means of the process of this invention and their subsequent use as an impact modifier for PVC.

Part 1—Preparation of a 98:2 n-Butyl Acrylate:1,3-Butylene Dimethacrylate Copolymer Latex The following ingredients are placed in a 1 quart bottle which is capped, heated to 70° C. and rotated for 2½ hours:

264 gms. $H_2O$
50 ml. of a 1%, by weight, aqueous solution of the bis (tridecyl) ester of sodium sulfosuccinic acid having an HLB value of ~ 4 to 7
33 ml. of a 2%, by weight, aqueous solution of potassium persulfate
3.3 gms. 1,3-butylene dimethacrylate
162 gms. n-butyl acrylate By means of this procedure, an emulsion having 30%, by weight, of resin solids is obtained wherein the copolymer particles have a particle size of about 0.29 microns.

Part 2—Preparation of a 70/30 PVC/n-Butyl Acrylate:1,3-Butylene Dimethacrylate Interpolymer The following ingredients are placed into a 1 quart bottle which is capped, heated and rotated at 38 r.p.m. for 8 hours at 60° C.:

70 gms. vinyl chloride
100 gms. of the latex whose preparation is described in Part 1
200 gms. $H_2O$
0.075 gms. azobisisobutyronitrile
40 ml. of a 1%, by weight, of an aqueous solution of polyvinyl alcohol A granular white powder is obtained which is air dried. These SEI particles have an average particle size of 100 microns and a bulk density of at least 0.2 gm./cm³.

Part 3—Use of the 70/30 Interpolymer as an Impact Modifier for PVC

Varying proportions of the above described interpolymer particles are intimately admixed with a commercially available polyvinyl chloride resin so that the resulting blends contain 5, 10 and 15%, by weight, respectively of rubber derived from the SEI particles. These blends are prepared using a two-roll mill, operating at 350-360° F., for a period of three minutes. As stabilizers, each sample contains 3 PHR of a tin mercaptide sold as "Thermolite 31" by M & T Chemicals, Inc. and 0.5 phr. of calcium stearate. The following table describes the composition of the various samples which are evaluated as well as the result obtained.

| Sample number | Con. of Rubber (derived from the SEI particles added to the PVC) | Tensile impact strength (ft. lbs./sq. in.) [1] |
|---|---|---|
| Control | 0 | 75 |
| 1 | 5 | 134 |
| 2 | 10 | 174 |
| 3 | 15 | 205 |

[1] ASTM Procedure D-1822-61T using a Type L specimen.

The above data clearly illustrate the improved impact characteristics imparted to PVC upon its admixture with the SEI particles of this invention. Moreover, comparable results are obtained upon blending these SEI particles with a 97:3 vinyl chloride:vinyl acetate copolymer.

Part 4—Use of the 70/30 Interpolymer as an Imapct Modifier for a Styrene-Acrylonitrile Copolymer A blend of a styrene-acrylonitrile polymer with the above described interpolymer is prepared by milling, for 5 minutes at a temperature of from 310-330° F., a formulation consisting of 50 parts of the 70/30 PVC/butyl acrylate:butylene dimethacrylate SEI particles whose preparation is described hereinabove, 50 parts of a 75:25 styrene:acrylonitrile copolymer, 0.3 parts of stearic acid and 0.75 parts of an acrylic polymer processing aid sold as "Acryloid K-120N" by the Rohm & Haas Co. The resulting blend is white in color and displays excellent resistance to shock. This blend has a limiting oxygen Index (L.O.I.) of 21-22 whereas conventional ABS has an L.O.I. of 18.5. The LOI is a means of evaluating the fire retardancy of a material. It is determined by means of the procedure described by Fenimore and Martin in the November, 1966, issue of Modern Plastics. In brief, this procedure directly relates flame retardancy to a measurement of the minimum percentage concentration of oxygen in a oxygen:nitrogen mixture which permits the sample to burn; the LOI being calculated as follows:

$$LOI = \frac{[O_2]}{[O_2]+[N_2]} \times 100$$

Thus, a higher LOI is indicative of a higher degree of flame retardancy.

Part 5—Use of the 70/30 Interpolymer as an Impact Modifier for a Tertiary Butyl Styrene-Acrylonitrile Copolymer Using the milling procedure described in Part 4, hereinabove, there is prepared a blend of 50 parts of the above described 70/30 PVC/butyl acrylate:butylene dimethacrylate SEI particles and 50 parts of a 75:25 tertiary butyl styrene:acrylonitrile copolymer. The resulting blend displays excellent physical properties including a heat distortion temperature substantially higher than that of conventional PVC and good flame retardance characteristics as evidenced by the fact that it is self-extinguishing when evaluated by means of ASTM test D-635. Comparable results with respect to the physical properties of the resulting products are obtained upon blending the SEI particles with various other rigid, thermoplastic polymers including polymethyl methacrylate, polymethacrylonitrile, high density polyethylene, nylon 66, cellulose acetate and a polyacetal resin.

EXAMPLE II

This example illustrates the preparation of another of the novel interpolymers of this invention.

Part 1—Preparation of a 98:2 n-Butyl Acrylate:1,3-Butylene Dimethacrylate Copolymer Latex The following ingredients are placed in a 1 quart bottle which is capped, heated to 70° C. and rotated for 2½ hours:

220 gms. $H_2O$
170 ml. of 1%, by weight, aqueous solution of sodium 2-ethylhexylsulfate (HLB value=~40)
52 ml. of a 2%, by weight, aqueous solution of potassium persulfate
3.5 gms. of 1,3-butylene dimethacrylate
172 gms. n-butyl acrylate By means of this procedure, an emulsion having 29%, by weight, of resin solids is obtained wherein the copolymer particles have a particle size of about 0.30 microns.

Part 2—Preparation of a 75/25 PVC/n-Butyl Acrylate:1,3-Butylene Dimethacrylate Interpolymer The following ingredients are placed into a 1 quart bottle which is capped, preheated and rotated at 38 RPM for 7½ hours at 60° C.:

100 gms. vinyl chloride
120 gms. of the latex whose preparation as described in Part 1 of this example
160 gms. $H_2O$
0.075 gms. azobisisobutyronitrile
60 ml. of a 1%, by weight, aqueous solution of hydroxypropyl methyl cellulose having a viscosity of 15,000 cps.

A granular white powder is obtained which is air dried. These SEI particles have an average particle size of 100 microns and a bulk density of at least 0.2 gm./cm.$^3$. The properties of this product are comparable to those of the product of Example I.

EXAMPLE III

This example illustrates the improved results obtained when hydroxypropyl methyl cellulose having a viscosity of about 15,000 cps. is used as the suspending agent during the suspension polymerization step of the process of this invention.

Part 1—Preparation of Rubber Latex

A crosslinked 98:2 n-butyl acrylate:1,3-butylene dimethacrylate copolymer latex is prepared by combining 100 pounds of water, 50 grams of potassium persulfate and 48.5 grams of the bis(tridecyl) ester of sodium sulfosuccinic acid in a 20 gallon reactor. Forty four pounds of n-butyl acrylate are then combined with 404 grams of 1,3-butylene dimethacrylate and the resulting mixture is divided into three equal portions. The first of these portions is charged into the reactor which is then heated to 70° C. with gentle agitation and maintained at this level until an exothermic reaction starts. As soon as the exotherm subsides, the second portion of the monomer mixture is charged into the reactor which is heated to 70° C. in order to permit the reactants to attain an exotherm. Finally, the remaining portion of monomer is charged and allowed to react. After a total reaction period of about 1½ hours, the final exotherm subsides, the reaction mixture is allowed to cool to room temperature. The resulting latex contains 30%, by weight, of resin solids.

Part 2—Evaluation of Suspending Agent

A total of about 20 grams of the selected suspending agent, as set forth in the following table, is dissolved in about 20 pounds of water whereupon an additional 23.125 pounds of water is added and the entire solution is charged into a 10 gallon reactor along with 18 pounds of the latex whose preparation is described in Part 1, hereinabove, and 6.7 grams of azobisisobutyronitrile. The charged reactor is evacuated twice in order to displace the oxygen therefrom whereupon 16.94 pounds of vinyl chloride is introduced. The charged reactor is vigorously agitated, heated to 60° C. and held at this level until the pressure gauge shows a 38 psia pressure decrease. Unreacted vinyl chloride is then vented and the contents of the reactor allowed to cool to room temperature. The resulting granular polymer is then filtered, washed and dried. In each case, the resulting product is 70/30 PVC n-butyl acrylate:1,3-butylene dimethacrylate copolymer.

To obtain the particle size distribution, 100 grams of the dried polymer are placed on the top screen of a set of U.S. Standard Mesh sieves and shaken for 30 minutes whereupon the weight retained on each screen is then determined. In addition, after each run, the reactor is opened and its wall examined for plate out, i.e. for polymer coating. The following table provides the results of this study.

| | Suspending agent used | | |
|---|---|---|---|
| | Hydroxypropyl methyl cellulose (viscosity = 35 cps.) | Polyvinyl alcohol | Hydroxypropyl methyl cellulose (viscosity = 15,000 cps.) |
| Suspending agent, wt. | 20 gms. | 19.2 gms. | 20 gms. |
| Sieve analysis on— | Percent particles retained | | |
| 40 mesh | 2.0 | 0.4 | 0.4 |
| 60 mesh | 17.1 | 6.0 | 0.4 |
| 80 mesh | 36.9 | 32.5 | 1.3 |
| 100 mesh | 25.9 | 38.7 | 5.9 |
| 140 mesh | 13.5 | 19.9 | 68.0 |
| 200 mesh | 2.5 | 1.5 | 21.0 |
| Pan | 2.1 | 1.0 | 3.0 |
| Reactor appearance | (¹) | (²) | (³) |

¹ Extensive plate out.
² Very slight plate out.
³ Virtually no plate out.

EXAMPLE IV

This example illustrates the use of the novel interpolymers of this invention in the preparation of blends with various thermoplastic polymer substrates and also demonstrates the superior impact values of these blends as compared with the results obtained with unmodified samples of the identical thermoplastic polymers.

The formulations described in the following table are prepared using a two-roll mill, operating at 350–360° F., for a period of about three minutes.

| Formulation number | 1 | 2 | 3 | 4 | 5 |
|---|---|---|---|---|---|
| The 70/30 interpolymer whose preparation is described in Example 1 | 50 | 50 | 50 | 50 | 50 |
| An ASA resin sold as "Luran 776" by the Badische Anilin & Soda Fabrik A.G. | 50 | | | | |
| An MBS resin sold as "XT 500" by the American Cyanamid Co. | | 50 | | | |
| An ABS resin sold as "Cycolac H.E." by the Marbon Chemical Division of the Borg-Warner Corp. | | | 50 | | |
| An ABS resin sold as "Blendex 301" by the Marbon Chemical Division of the Borg-Warner Corp. | | | | 50 | |
| An MBS resin sold as "Acryloid KM 611" by the Rohm & Haas Co. | | | | | 50 |
| "Thermolite 31" | 1.5 | 1.5 | 1.5 | 1.5 | 1.5 |
| A monostearate lubricant solid as "Aldol MS" by Glyco Chemicals, Inc. | 1.0 | 1.0 | 1.0 | 1.0 | 1.0 |
| Tris(nonylphenyl)phosphite | 1.0 | 1.0 | 1.0 | 1.0 | 1.0 |

The impact resistance of each of the above described blends is then determined with respect to their tensile impact strength and Izod impact strength values. These same properties are also evaluated for a series of control formulations containing samples of each of the above listed thermoplastic polymers which do not, in this case, contain the novel interpolymer modifier of this invention but which do, on the other hand, contain all of the other ingredients which are present in the above described formulation. The results of these evaluations are presented in the following table:

| | | Izod impact strength (ft. lbs./sq. in.)[1] | | Tensile impact strength (ft. lbs./sq. in.)[2] | |
|---|---|---|---|---|---|
| Formulation No. | Thermoplastic polymer | 50/50 blend with interpolymer | Control (unmodified sample) | 50/50 blend with interpolymer | Control (unmodified sample) |
| 1 | "Luran 776" | 12.9 | 5.0 | 250 | 123 |
| 2 | "XT 500" | 14.9 | 2.9 | 193 | 48 |
| 3 | "Cycolac H.E." | 10.7 | 6.3 | 205 | 54 |
| 4 | "Blendex 301" | 11.2 | 3.8 | 204 | 158 |
| 5 | "Acryloid KM 611" | 11.6 | 8.3 | 323 | 204 |

[1] ASTM Procedure D-256.
[2] ASTM Procedure D-1822-61T using a Type L specimen.

The above given data clearly demonstrates the unusual increase that is achieved in the impact strength of a variety of thermoplastic polymers upon their being blended with the novel interpolymer impact modifiers of this invention.

EXAMPLE V

This example illustrates the preparation of one of the novel interpolymers of this invention by means of a procedure in which both the emulsion and suspension polymerization procedures are carried out in the same reaction vessel.

Part 1—Preparation of a 98:2 Butyl Acrylate:Ethylene Glycol Dimethacrylate Copolymer Latex The following ingredients are placed into a 10 gallon reactor and are then heated to 75° C. for 1½ hours:

52 lbs. deionized water
7.0 gms. of a 1%, by weight, aqueous solution of the bis(tridecyl) ester of sodium sulfosuccinic acid (HLB value=~4 to 7)
2.5 gms. sodium bicarbonate
6.4 gms. potassium persulfate
50.8 gms. ethylene glycol dimethacrylate
5.6 lbs. n-butyl acrylate By means of this procedure, an emulsion having 10%, by weight, of resin solids is obtained wherein the copolymer particles have a particle size of about 0.3 microns.

Part 2—Preparation of a 70/30 PVC/n-Butyl Acrylate: Ethylene Glycol Dimethacrylate Interpolymer While still in the same reaction vessel used for its preparation as described in Part 1 hereinabove, the latex is cooled to 40° C. and the following ingredients added thereto:

15 gms. of hydroxypropyl methyl cellulose (Visc.=15,000 cps) dissolved in 5 lbs. of deionized water
6.7 gms. azobisisobutyronitrile
17 lbs. vinyl chloride The resulting mixture is heated to 60° C. until a pressure drop of about 40 p.s.i. occurs. A granular white powder is thereby obtained which is then air dried. These SEI particles have an average particle size of 100 microns and a bulk density of at least 0.2 gm./cm.$^3$.

EXAMPLE VI

This example illustrates the preparation of another of the novel interpolymers of this invention by means of a procedure in which both the emulsion and suspension polymerization procedures are carried out in the same reaction vessel.

Part 1—Preparation of a 98:2 Butyl Acrylate:1,3-Butylene Dimethacrylate Copolymer Latex The following ingredients are placed into a 30 gallon reactor and are then heated to 75° C. for 1½ hours:

121.3 lbs. deionized water
19.0 gms. of a 1%, by weight, aqueous solution of the bis(tridecyl) ester of sodium sulfosuccinic acid (HLB value=~4 to 7)
13.3 gms. sodium bicarbonate
17.0 gms. potassium persulfate
142.9 gms. 1,3-butylene dimethacrylate
15.0 lbs. n-butyl acrylate By means of this procedure, an emulsion having 11%, by weight, of resin solids is obtained wherein the copolymer particles have a particle size of about 0.3 microns.

Part 2—Preparation of a 23/77 PVC/n-Butyl Acrylate: 1,3-Butylene Dimethacrylate Interpolymer While still in the same reaction vessel used for its preparation as described in Part 1 hereinabove, the latex is cooled to 40° C. and the following ingredients added thereto:

25.0 gms. of hydroxypropyl methyl cellulose (Visc. =15,000 cps.) dissolved in 5 lbs of deionized water
4.1 gms. azobisisobutyronitrile
7.05 lbs. vinyl chloride
60.0 lbs. deionized water The resulting mixture is heated to 60° C. until a pressure drop of about 80 p.s.i. occurs. A rubbery white powder is thereby obtained which is then air dried. These SEI particles have an average particle size of 100 microns and a bulk density of at least 0.15 gm./cm.$^3$. Upon being blended with samples of a PVC and ABS resin in a concentration such that each of the resulting blends contain about 20% of acrylic rubber derived from these SE1 particles, it is found that there is a substantial improvement in the impact resistance of these blends.

Variations may be made in proportions, procedures and materials without departing from the scope of this invention as defined in the following claims.

What is claimed is:

1. The method of making acrylic rubber-containing interpolymer particles which comprises: (1) emulsion polymerizing a monomer charge comprising at least one monomer selected from the group consisting of aromatic and $C_2$–$C_8$ alkyl acrylates, and mixtures of the acrylates with each other and with a minor proportion of at least one other vinyl monomer, and also comprising a monomer having more than one ethylenically unsaturated group said charge being capable of forming a crosslinked acrylic rubber having a glass transition temperature of less than about 25° C. in the presence of an emulsifier having an HLB value of from about 2 to 12 or greater than about 40 thereby providing an aqueous latex of crosslinked acrylic rubber emulsion polymer particles; and, (2) completing the preparation of said interpolymer particles by suspension polymerizing a monomer charge comprising vinyl chloride or a mixture of vinyl chloride and minor proportions of at least one other vinyl monomer in the presence of the particles resulting from step (1), the resulting vinyl chloride suspension polymer thereby surrounding or being homogeneously dispersed within the mass of said crosslinked acrylic rubber emulsion polymer particles.

2. The method of Claim 1, wherein said crosslinked acrylic rubber emulsion polymer comprises from about 2.0 to about 80%, by weight of said interpolymer particles.

3. The method of claim 1 wherein the acrylate monomer is n-butyl acrylate.

4. The method of claim 1, wherein said monomer having more than one ethylenically unsaturated group is selected from the group consisting of 1,3-butylene dimethacrylate, ethylene glycol dimethacrylate, diethylene glycol dimethacrylate; triethylene glycol dimethacrylate and trimethylol propane trimethacrylate.

5. The method of claim 1, wherein said emulsifier is selected from the group consisting of the bis(tridecyl) ester of sodium sulfosuccinic acid and sodium 2-ethylhexyl sulfate.

6. The method of Claim 1, wherein step (2) is conducted in the presence of a suspending agent comprising hydroxypropyl methyl cellulose having a viscosity of at least about 3,000 cps.

7. The method of Claim 11, wherein said hydroxypropyl methyl cellulose has a viscosity of about 15,000 cps.

8. The method of Claim 1, wherein in step (1) said monomer charge is divided into about three equal portions which are separately introduced into the system over a period of about 3 hours.

9. The method of Claim 1, wherein the crosslinked rubber emulsion polymer particles resulting from step (1) have a particle size in the range of from about 0.1–0.8 microns.

10. The method of Claim 1, wherein the interpolymer particles resulting from step (2) have a particle size in the range of from about 10 to 200 microns and a bulk density of at least about 0.15 gm./cm.³.

11. A rubber-containing interpolymer particle resulting from the process of Claim 1 comprising the crosslinked acrylic rubber emulsion polymer having a glass transition temperature of less than about 25° C. and a vinyl chloride suspension polymer which surrounds and/or is homogeneously dispersed within the mass of said rubber emulsion polymer.

12. The particle of Claim 11, wherein said crosslinked acrylic rubber emulsion polymer comprises from about 2.0 to about 80%, by weight, of said particle.

13. The particle of Claim 11, wherein said acrylic rubber emulsion polymer of said particle is a crosslinked copolymer of n-butyl acrylate and a monomer having more than one ethylenated unsaturated group.

14. The particle of Claim 11, wherein said monomer having more than one ethylenically unsaturated group is selected from the group consisting of 1,3-butylene dimethacrylate, ethylene glycol dimethylacrylate diethylene glycol dimethacrylate; triethylene glycol dimethacrylate and trimethylol propane trimethacrylate.

References Cited

UNITED STATES PATENTS

| | | | |
|---|---|---|---|
| 3,206,424 | 9/1965 | Heinrich et al. | 260—29.6 |
| 3,290,265 | 12/1966 | Kaneko et al. | 260—29.6 |
| 3,502,604 | 3/1970 | Nakatsuka et al. | 260—29.6 |
| 3,548,034 | 12/1970 | Cleeman et al. | 260—884 |
| 3,651,175 | 3/1972 | Ide et al. | 260—876 R |
| 3,655,825 | 4/1972 | Souder et al. | 260—876 R |
| 3,657,172 | 4/1972 | Gallagher et al. | 260—29.6 RB |
| 3,660,529 | 5/1972 | Groch | 260—876 R |
| 3,488,406 | 1/1970 | Sehm | 260—899 |

FOREIGN PATENTS 1,090,857  10/1960  Germany.

WILLIAM SHORT, Primary Examiner

E. A. NIELSEN, Assistant Examiner

U.S. Cl. X.R.

260—879, 884

PO-1050
(5/69)

UNITED STATES PATENT OFFICE
CERTIFICATE OF CORRECTION

Patent No. 3,832,318  Dated August 27, 1974

Inventor(s) Ruth E. Gallagher et al.

It is certified that error appears in the above-identified patent and that said Letters Patent are hereby corrected as shown below:

Col. 1, line 48, change "procedure" to --procedures--;

Col. 2, line 29, change "2-50%" to --2-80%--;

Col. 6, line 3, change "40" to --20--;

Col. 7, line 21, change "50%" to --80%--;

Col. 7, line 26, change "30-50%" to --30-55%--;

Col. 7, line 27, change "50-70%" to --55-70%--;

Col. 9, line 71, change "or methacrylate" to --ester--;

Col. 16, line 14, change "SE1" to --SEI--;

Col. 16, line 62, change "Claim 11" to -- Claim 6 --.

Signed and sealed this 29th day of April 1975.

(SEAL)
Attest:

RUTH C. MASON
Attesting Officer

C. MARSHALL DANN
Commissioner of Patents
and Trademarks

UNITED STATES PATENT OFFICE
CERTIFICATE OF CORRECTION

Patent No. 3,832,318    Dated August 27, 1974

Inventor(s) Ruth E. Gallagher et al.

It is certified that error appears in the above-identified patent and that said Letters Patent are hereby corrected as shown below:

Col 1, line 48, change "procedure" to --procedures--;

Col 2, line 29, change "2-50%" to --2-80%--;

Col 6, line 3, change "40" to --20--;

Col 7, line 21, change "50%" to --80%--;

Col 7, line 26, change "30-50%" to --30-55%--;

Col 7, line 27, change "50-70%" to --55-70%--

Col 9, line 71, change "or methacrylate" to --ester--;

Col 16, line 14, change "SE1" to --SEI--;

Col 16, line 62, change "claim 11" to --claim 6--.

Signed and Sealed this ninth Day of March 1976

[SEAL]

Attest:

RUTH C. MASON
Attesting Officer

C. MARSHALL DANN
Commissioner of Patents and Trademarks